United States Patent Office 3,199,268
Patented Aug. 10, 1965

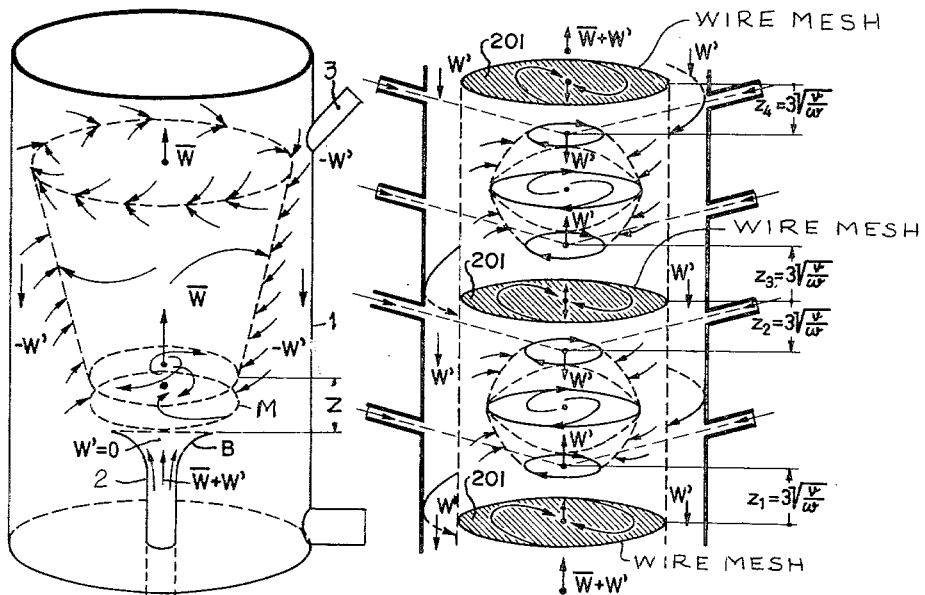
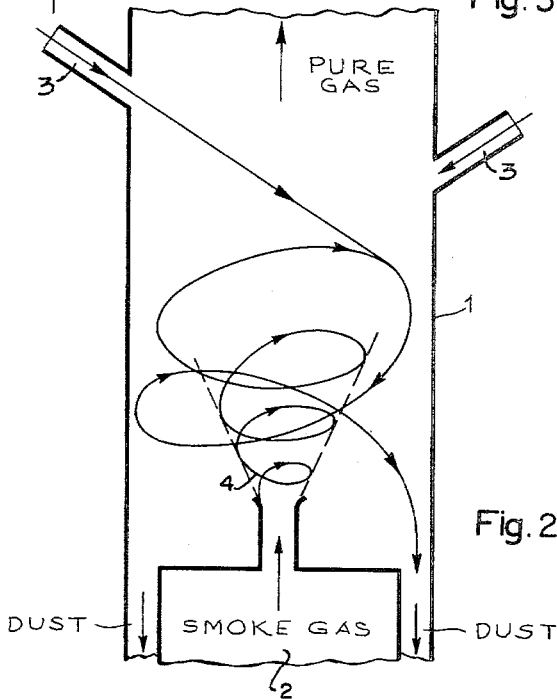
Fig. 1   Fig. 3   Fig. 2

3,199,268
PARTICLE-FROM-GAS SEPARATORS
Karl-Heinz Oehlrich, Karl-Rudolf Schmidt, Hans Zenneck, Erwin Schaufler, and Hans-Gunter Heitmann, all of Erlangen, Germany, assignors to Siemens-Schuckertwerke Aktiengesellschaft, Berlin, Germany, a corporation of Germany
Filed Aug. 25, 1959, Ser. No. 835,886
Claims priority, application, Germany, Nov. 3, 1958,
S 60,472
10 Claims. (Cl. 55—261)

Our invention relates to the production of relative forces by motion of fluid media and the utilization of such fluid-internal forces for separating.

The fluid media used for the purposes of the invention may be gaseous, liquid, or fluidizable solid, i.e. pulverulent or granular, constitution, and the fluid medium set in motion for producing the relative forces to be utilized may comprise mixed substances of different phase or constitution, substances of the same phase but of different density or configuration, or solid particles coarsely or finely distributed in liquid or gaseous substance. The motion may also be imparted to liquid constituents dispersed within a gaseous substance alone or together with likewise dispersed solid particles. That is, the invention is applicable to any fluids that are inhomogeneous in the general sense, including any mixtures, emulsions, suspensions or other flowable aggregations.

It is an object of our invention to produce, for a variety of diverse technological purposes, certain motions and forces within the flowing media so as to produce in the fluid medium certain relative forces, more specifically explained below, for the particular technological purpose to be met. Among these purposes, for example, is the separation of dust from gas or liquid, the processing of substances of the same phase or constitution but diverse density, particle size or configuration, and the separation or classification of mixtures, such as a separation of gases, vapors or liquids.

By comparison, and as will be more fully understood from the explanations below, the present invention involves the production of a different, accurately defined flowing motion in which relative forces are produced within the body of fluid, by virtue of which forces it becomes possible to obtain the intended effects to a maximum extent and to make them controllable and regulatable within wide limits.

The method according to our invention comprises a utilization of certain phenomena, particularly relative forces, which manifest themselves in a circulatory flow of fluid over a "solid ground" (also called "solid plate" or "solid boundary"), in a superposition or combination of a potential flow and a rotational flow. Such a circulatory flow above "solid ground" is superimposed as a secondary flow upon a primary flow of the inhomogeneous fluid medium passing through an enclosed processing space. There are various ways according to the invention of exciting and superimposing the circulatory secondary flow upon the primary flow, as will be set forth presently.

One way of superimposing upon the primary flow a circulatory flow, composed of a potential flow and a rotational flow above solid ground, is to inject into the primary flow a second quantity of fluid medium in a direction tangential and inclined to the primary flow axis. Another way of exciting the circulatory flow is to impart to the primary flow of fluid a stirring motion or to provide for rotation of wall portions or impeller surfaces within the space containing the fluid. It should be kept in mind that there is a fundamental difference between the rotational flow (rotation of particles) and the circulatory flow (flow along a closed curve) of a fluid medium.

The device or vessel structure serving for the production of a desired circulatory flow of the type described above may possess openings in the walls of the processing vessel in which a circulatory flow is to be produced, and the described injection of a suitable medium in a slanting or tangential direction may be effected through these openings. The openings may consist of slits, ducts, nozzles, stationary flat-head nozzles, guiding vanes or the like through which the medium, for example gases or vapors, are blown into the processing space. Depending upon the particular requirements of the intended application, the substances to be tangentially supplied may be the same as those to be processed in the vessel, or they may be of similar type, or other auxiliary media and additional substances may be blown or otherwise caused to flow into the processing space.

Stirrer motions of solid impeller structures may be used for exciting either the rotational flow or the potential flow. Applicable for exciting the rotational flow is a revolving shaft on which blades or other stirrer members are rigidly mounted. The blade faces may be located in an axial plane. Suitable, for example, are propellers or magnetic stirrer devices of conventional type. The rotational-flow exciting, stirring operation must be effected coaxially with respect to the desired circulatory flow or its rotational-flow branch. The location of the impeller structures on the shaft can be chosen at will within wide limits, except that they should not be located at the ends of the flow branches. If desired, the flowing medium may also be placed in rotation by fixed guiding vanes or baffles or the like stationary structures.

A primary excitation of the potential flow is effected with movable blades whose angular velocity is directed in opposition to the direction of motion and hence is zero relative to space. Used for this purpose, for example, is an arm whose axis coincides with that of the circulatory flow and which rotates about that axis. The stirrer arm is located at a location spaced from the axis and rotates at the same angular speed but in a direction opposed to that of the shaft rotation. Obviously, any other known devices suitable for such purposes are likewise applicable, and the same applies to the use of any suitable combinations of such devices.

A rotary motion, to be effected by means of rotating wall portions or surface members within the processing space, may also be produced by means of rotationally symmetrical structures such as discs, cylinders, drums or cones, which are either perforated or possess irregularities at least on their surface. Such rotationally symmetrical structures may possess on their entire surface or at least at the active surface portion, the design of a lattice, wire mesh or structure that incorporates "roughness." The rotationally symmetrical bodies, as the case may be, may be designed or provided with means to produce an artificial axial flow component. When using rotating discs or similar axially symmetrical structures, these may operate together with a solid ground or "rough ground" (also called "rough plate" or "rough boundary").

Conversely, the circulatory motion of the medium may also be excited or modified by applying rotary motion to the rough ground. The control or modification thus to be effected by the rough ground may include a rotation of the ground in a sense opposed to that of the desired circulatory flow of the medium; that is, in each case a relative motion is produced with respect to other wall portions or surfaces within the processing space of the container.

The rough ground can be produced in various ways. As mentioned, mechanical roughness is obtainable by an irregular design of the ground surface, for example by giving the irregularities or bosses a semicircular cross section. A lattice or mesh structure may also be provided for that purpose. Furthermore the solid ground may be formed only virtually within the processing space by providing for a moving medium in a steady circulatory flow which possesses an opposed flow component, which may also be termed "back pressure," thus being in effect a "solid boundary" although no solid structure is present at the solid-boundary location.

The roughness of the solid ground substitutes for the natural viscosity of the flowing medium by impeding the fluid motion so that the apparent sheard stresses are higher by decimal orders of magnitude than the natural viscosity of the medium. This, as well as similar phenomena and possibilities, such as the use of boundary-layer suction nozzles and boundary-layer pressure nozzles, will be more fully dealt with below with reference to preferred embodiments and preferred applications of the invention.

According to another feature of our invention, the effect of the circulatory flow above a solid ground is augmented by providing for two or more circulatory flows above the solid ground, or by providing a plurality of circulatory flows in serial or mutually opposed relation so that fractionating processes become possible. For reducing the flow resistance and energy loss of an individual stage or several series-connected stages, a parallel connection of individual stages or chains of stages is preferable in some cases. In such combined processes and devices, a plurality of rough grounds is obtainable in the same manner as described in the foregoing.

For further explanation of the invention and the underlying phenomena, it appears helpful, before describing specific embodiments, to further explain the described circulatory flows above a solid ground, mainly for the purpose of defining the terms used in this specification in accordance wth those customary in fluid mechanics.

Fluid flows in which no internal friction occurs, are called "potential flow." Due to the absence of internal friction, a potential flow is not subjected to internal energy losses so that the total energy initially inherent in the flow remains preserved. In flows of fluid occurring in nature, friction is essentially limited only to the zones of the boundary layer at those surfaces which limit the flow, whereas the friction within the flow itself is approximately zero. At the contacted boundary surfaces the occurring friction results in formation of shearing forces which withdraw energy from the flow. This energy is in part consumed for releasing a secondary flow. Hence a distinction must be made between the primary flow constituted by the energy dissipating flow, and the secondary flow which receives energy from the primary flow. In many cases, the secondary flow possesses greater technological importance than the primary flow causing the second flow.

When producing a flow within a containing vessel, the occurring secondary flow receives its energy from the shearing forces which the primary flow exerts upon any wall portions, for example upon the lateral walls, and on the so-called "ground." Without friction at boundary surfaces, no secondary flow can take place. With increased friction at the boundary surfaces, the shearing forces adjacent to the wall are increased and the resulting secondary flow is likewise increased. The original or impressed primary flow always becomes superimposed by a secondary flow as soon as any surfaces, for example the side walls or the ground, limiting the flowing medium produce an appreciable amount of friction. In practice, this is always the case to a greater or lesser extent. The secondary flow caused by the shearing forces at the friction-producing surfaces penetrates far into the original, primary flow because the secondary flow, which may again be looked upon as being the source of a tertiary flow, may likewise have no appreciable internal friction. It is possible, therefore, that a secondary flow, in turn, may dissipate energy at a rough surface to a tertiary flow, whereby of course the formation of the secondary flow is subjected to modification.

The foregoing explanation forms a basis for the understanding of fluid motions which in fluid mechanics are termed "circulatory flow above a solid ground" and which are of interest for the present invention. It will be understood that, when a liquid in a cylindrical or similarly shaped rotationally-symmetrical vessel is subjected to stirring motion about the vessel axis, the flow produced by the stirrer can be looked upon as being a primary flow. This primary flow releases a secondary flow, the possible formation of tertiary or further derivative flows being at first ignored. With such a stirring motion, the liquid is not only placed in circulating motion at the outer rim of the vessel but is also pressed downwardly. The flow lines directed downwardly at the external perimeter then run together on the bottom of the vessel near the vessel center, and the flow then moves upwardly in the center range. After reaching the surface zone, the flow lines again extend from the center radially outwardly.

This flow extending vertically downward and upward as well as toward the center at the bottom and toward the periphery at the top, superimposes itself upon the primary circulatory flow. Consequently, the liquid particles move on the periphery on a helical line downwardly but, when they reach the vessel bottom, the motion converts to an approximately logarithmic spiral along which the particles reach the center whence they rise near the center axis. The ascending motion in the center takes place in form of a rotational motion along a helical line of relatively narrow diameter (vortex filament) depending upon the active range of the shearing forces. On the top surface, the course of the flow again corresponds to a spiral, now extending from the center outwardly.

The flow motion just described constitutes a simple form of the one usually designated in fluid mechanics as "circulatory flow above a solid ground" (coffee-cup flow).

The merging of all flow lines in the center of the ground is tantamount to the formation of a vortex sink from which a vortex filament, being a rotational flow, extends upwardly. At a certain height, inversely proportional to the square root of the angular velocity, a spacial vortex source forms itself. In the vortex source there occurs a surprising effect explained further below.

If different substances are present in the flow, or if with one and the same medium there are particles of respectively different phase or configuration. then the particles split off from the vortex source are flung outwardly and may reach the downwardly directed stirrer flow located outside of the vortex source and extending helically downward. This stirrer flow, representing the exciting or primary flow, conveys the flung-away particles to the outer rim zone of the vessel bottom. It is essential, however, that such particles are not driven against the vessel wall but are kept on a cylinder surface by virtue of noncentrifugal forces still to be explained. Consequently, the particles remain within the flow and, contrary to what is usually expected are not carried by centrifugal forces against the vessel wall. It is obvious, therefore, that forces are active that are not identical with centrifugal force.

The distance of the vortex source from the solid bottom further depends upon the roughness of the bottom which, physically, constitutes the "solid ground." The excitation energy for the tertiary flow, taken from the secondary flow, increases with increasing roughness as will readily be understood from the foregoing explanations. Consequently the position and shape of the vortex source can be predetermined by the design of the rough ground. A concave ground imparts to the vortex source a shape contracted in the radial direction. A convex design of the ground results in deformation of the vortex source to a fuller shape radially expanded outwardly. In the latter case the vortex source closely approaches the external primary flow extending helically downward. Due to this short distance, there is a greater probability that a fluid particle flung out of such a vortex source will be carried out into the primary flow and will thus be separated. Consequently for each particle there is a certain separation probability which follows statistical laws and which, as a rule, is to be kept as high as possible in all cases where a separation, for example a dust separation, is desired. If the flow is to be utilized for reducing or eliminating noise or sound, then the boundary line or area, usually designated as "deformed plane" must extend as a closed area around the source of the sound. The foregoing examples will suffice for indicating the particular requirements that can be met by the circulatory flow, depending upon the particular purpose for which the invention is to be used.

The consideration of the resulting vortex sinks and vortex sources, facilitates understanding the "relative forces" referred to in this disclosure. The vortex sink forming itself at the bottom of the processing vessel, is comparable with the vortex sink occurring when draining liquid through a drain pipe. The rotating velocity of the fluid particles increases when the particles approach the vortex filament, a phenomenon often observable when draining water from a bathtub. The peripheral velocity of the particles decreases gradually with increasing distance from the vortex source. The vortex filament extends between the vortex sink and the vortex source. While in a drainpipe there occurs a downwardly directed helical motion, the flow conditions here of interest have a vortex filament which, as explained, extends upwardly.

If one lays an imaginary cross section horizontally through the vortex filament beneath the vortex source, the resulting flow-field picture is such that the peripheral speed of the fluid particles at first increases with increasing distance from the center of the vortex filament of the circulatory flow.

However, a different flow-field picture is obtained if one extends an imaginary cross section horizontally through the vortex sink in the vicinity of the bottom. Now the particles travel approximately on a logarithmic spiral inwardly. An imaginary horizontal cross section in the vicinity of the upper surface, extending through the vortex source, would show a travel of the particles substantially along a logarithmic spiral in the outward direction.

While a horizontal section through the middle of the processing vessel does not offer further interesting flow configurations, the imaginary horizontal sections in the vicinity of the top surface offer information about the particle motion on inwardly and outwardly directed spiral paths upon which an acceleration on the one hand, and a deceleration on the other hand is obtained. For a particle that, within the vortex filament, moves upwardly, the peripheral velocity, therefore, must change spontaneously as the particle enters into the vortex source. The same applies to the angular velocity because the particle, as set forth above, passes from a rotational flow into a potential flow and vice versa. Due to the occurring change in velocity and angular velocity, the particle is subjected to acceleration. Thus there occurs a force which is proportional to that acceleration and to the particle mass and which is directed toward the interior at the vortex sink and toward the outside at the vortex source. This force, having the character of a Coriolis force, is called "relative force."

Also effective, simultaneously with the relative force explained above, is a centrifugal force which has the same direction as the relative force in the vortex source but which is opposed to the relative force in the vortex sink. As a result, a virtually spontaneous spreading-apart of the particles comes about in the vortex source, whereas a corresponding phenomenon in the vortex sink takes place more slowly and in the opposite sense. It will be recognized that the relative force must be considerably stronger than the centrifugal force.

It may be added at this place that, due to the circulatory flow, there is also produced an additional, sinusoidal relative force. This sinusoidal force, in accordance with a further feature of the invention, can be taken advantage of by virtue of the fact that it manifests itself, for example in air flows, as infra-sonic action and causes a viscosity increase by orders of magnitude, as will be further explained hereinbelow. As a result, for example when applying this phenomenon in a suitable boiler firing system, the combustion is considerably promoted.

The described relative forces, as explained, originate in the transition zone between rotational flow and potential flow, and the rotational flow may occur above or below the potential flow as well as within or outside thereof or also conjointly with the potential flow or at a plurality of localities in alternating sequence.

The invention will be further explained with reference to the drawings illustrating the novel method by flow diagrams and showing, by way of example, a number of embodiments of apparatus according to the invention for producing and utilizing the fluid flow conditions according to the invention.

FIG. 1 shows schematically an embodiment of the invention designed as apparatus for separating dust from smoke gas.

FIG. 2 shows schematically and in vertical section another apparatus for removing dust from smoke gases.

FIG. 3 shows schematically a modified device with several serially active separation planes in a dust separator otherwise similar to that of FIG. 1.

Figure 4:
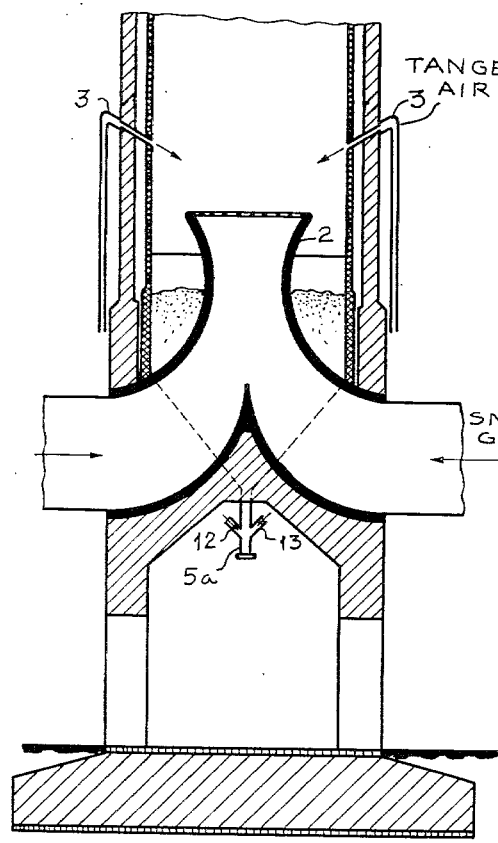
FIGS. 4 and 5 illustrate apparatus according to the invention for separating dust from smoke gas, and show, in axial section, two respective embodiments of flyash separators for smoke stacks.

A "solid ground" may be achieved by providing a solid structure, and also the same effect can be achieved by opposing the flow component to be eliminated by a a flow component of the same magnitude but in opposed direction. This opposing component may also be referred to as "back pressure." By thus providing for mutually opposed flows, the medium will follow a path that dodges away from the "imaginary" solid ground in both directions.

The embodiment illustrated schematically in FIG. 1 is particularly designed for dust removal. Dust-laden smoke-gas enters into the processing chamber 1 through an inlet duct 2. The upper end of chamber 1 acts as an outlet duct for pure gas. A circulating flow is excited by blowing medium into the container through respective tangential ducts 3 that are downwardly inclined. The resulting ring-shaped flow of gas constitutes the rough ground of the flow system. Dust settles at the bottom of the chamber 1 as indicated by the arrow in FIG. 1.

FIG. 3 shows schematically a series connection of several profile planes or stream surfaces 201, preferably of wire mesh, together with a series of inlets 3, which, afford a multiplying increase in degree of dust removal.

The primary flow can also be produced by means of guide vanes or blades, instead of blowing medium tangentially into the processing space in a downwardly inclined direction. The guide vanes or blades (not shown) may be mounted in the smoke-gas supply duct 2 ahead of the inlet opening shown in FIG. 2. As a result, the smoke-gas is forced to enter into the processing space while being set into twisting motion. Such a production of the secondary flow has been tested and found to be likewise applicable for the purposes of the invention.

As explained, when the primary flow is more strongly excited by blowing more air or gas through the nozzles 3 into the flow space, the vortex source shifts downwardly and reduces the spacing between source and the sink. As a whole, there occur the flow conditions illustrated in FIG. 1 and discussed above, according to which a closed source area is located within the "deformed" spacial plane identified by arrows.

When the primary flow is too strongly excited, the deformed plane shifts to below the opening 2a of the gas supply duct 2. For modifying the vertical flow components, the inlet duct 2 can be given a flaring opening beneath the location 4, as shown in FIGS. 1 and 2. As a result, the excitation of the primary flow can be reduced. That is, the wider the incoming flow of smoke gas, the smaller is the power required for blowing air or gas through the lateral nozzles 3, relative to one and the same smoke-gas throughput. As explained, the same effect is obtained by placing a wire mesh over the smoke-gas inlet opening 2a, or by providing for boundary-layer displacement by sucking or pressure action. A wire mesh as just mentioned is shown in FIG. 1 at M and in FIG. 5 at 102.

The excitation of the rotational flow by lateral injection of gas is not dependent upon any particular angle of injection which can be varied within wide limits and hence may depart from a strict tangent. The excitation of the primary flow can be chosen or controlled not only by the quantity of the gas being supplied through the inlet duct 2, but the resulting flow conditions, degree of separation and power consumption are also dependent upon the flow condition of the second quantity of air or gas being injected. For most favorable results, the second quantity of air, when entering the processing space in container 1, should possess a high static as well as a high rotary turbulence. Consequently, the shape of the nozzles has a considerable effect upon the above-mentioned properties of the separator. It is favorable, for example, to introduce the second quantity of air over a sharp edge or through a group of rotary propellers or vanes, or a combination of these means.

In lieu of exciting the primary annular flow by blowing gas tangentially and downwardly inclined into the flow space, a ring-shaped body with guide plates may be mounted in the smoke-gas flow ahead of the rotation 4. This causes the smoke-gas to enter into the processing space of container 1 with a twist that takes care of exciting the primary flow.

Such twist of the smoke-gases can also be produced with the aid of a rotary-turbulence nozzle as mentioned above with reference to the injection of the second quantity of air. In lieu of placing fixed guide plates on the ring-shaped body ahead of the location 4, the same result can also be obtained by using rotary propellers. This increases the twist of the flow due to additional relative forces. If the smoke-gas flow is introduced tangentially in inclined direction, and if the smoke-gas supply duct possesses a corresponding knee or curvature, then the resulting secondary flow produces a twist in the smoke-gas supply itself. In this manner, the smoke-gas energy itself is utilized for producing the circulating flow in the separator space so that the second quantity of air to be additionally injected can be reduced considerably.

It may be added that the cylindrical or tubular shape of the separator space shown in this application, though preferable for most purposes, is not absolutely necessary but may be modified depending upon the particular requirements or desirabilities.

As explained with reference to FIG. 3, a plurality of nozzle groups located above one another may be provided for blowing the second quantity of air or gas tangentially and in inclined direction into the processing space for producing two or more mirror-symmetrical circulating flows of which each two have a rough ground in common.

Figure 5:
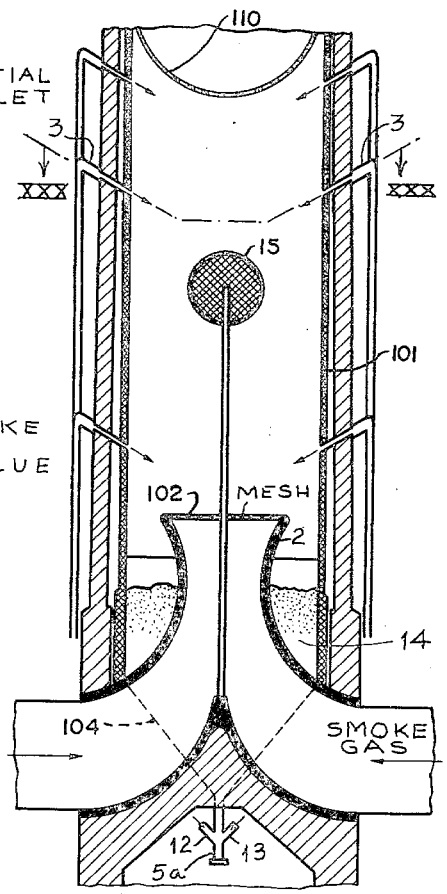

In FIG. 5 there are shown two auxiliary nozzles 12, 13 for injecting air into the discharge conduit 5a to produce an exhaust action for removing the collected dust from the bottom zone of the separator container 1. This way of removing the dust is preferable because a blower operating upon heavily dust-laden gas suffers excessive wear and, in most cases, has an unsatisfactorily short service life.

The device is suitable as a dryer or preheater for coal dust to be supplied to the burners of a boiler fire chamber. In this case, the fuel dust is admixed to flue gases entering through duct 2, and the dust-laden air leaving the discharge duct 5a can be directly introduced into the firing chamber.

Figure 6:
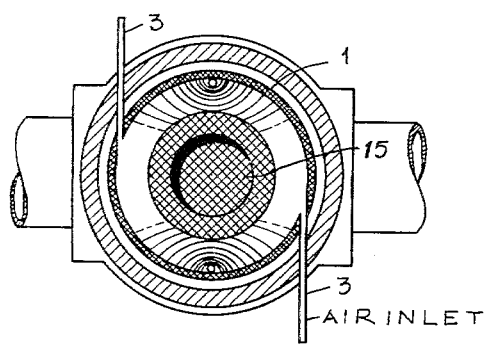
FIG. 6 is a transverse cross section applicable to each of FIGS. 4 and 5.

FIGS. 4 and 6 illustrate a single-stage separator for removing fly-ash from smoke-gas in a smoke stack; and FIGS. 5 and 6 illustrate a similar separator for two-stage operation. The latter device is provided with two rough grounds, and two deformed planes form themselves during operation. In both embodiments, the dust collects below in an annular space 14 from which it is removed through a discharge pipe 5a with lateral air supply nozzles 12, 13. The upper end of the main container in FIG. 5 forms a chimney stack and outlet duct into which a conventional screen 110 may be inserted. The screen 110 is only for the purpose of keeping large particles from being blown out of the stack into the air, and forms no part of the present invention. The device of FIG. 5 is provided with a spherical body 15 of wire mesh for catching the singular center flow, the mesh also acting as a rough ground.

More in detail, the separator according to FIGS. 5 and 6 has a chimney stack provided with a conventional refractory lining 101 on its inner wall for protection from excessively high gas temperatures. An outer potential flow is excited by means of several nozzles 3 which extend in a tangential and downwardly inclined direction to inject air or branched-off gas into the raw-gas current entering from below. A grid structure formed by wire mesh 102 is mounted on top of the smoke-gas opening of the gas-inlet duct 2 to constitute a solid rough ground above which the potential flow is converted to a coaxial rotary flow of the same diameter, the latter flow rotating in the same sense as the potential flow. As a result, there occur the flow conditions shown schematically in FIG. 1 and explained above. Coaxially mounted above the gas-inlet pipe 2 is a ball or spherical body 15 of wire mesh which prevents the raw-gas current from passing centrally through the separator and guides the gas current on all sides radially in the outward direction. In this manner, the raw-gas current is seized by the potential flow and is passed into the mixing zone, corresponding to 4 in FIG. 2, in which zone the dust is separated from the gas by the relative (Coriolis) forces. The dust collecting at the bottom of the separator is exhausted through the outlet 5a of a funnel-shaped discharge device 104. In FIG. 5, the main gas flow enters through the inlet duct 2 into the container 1 and leaves it through an outlet duct at the top. The second quantity of air is blown into the housing through one or more tangential and downwardly-inclined nozzle ducts 3. The separated dust collects in an annular bottom space 14 and is removed through a discharge pipe 5a.

By virtue of the favorable degree of dust removal which is not affected by high temperatures, the invention affords combining gas turbines with boiler firing systems. Heretofore, solid fuels have either not been used in gas turbine plants or it was necessary to use comprehensive dust-separator plants apt to impair the economy of the plant due to the reduction in service life of gas turbines caused by entrained dust particles. In contrast thereto, the degree of dust removal afforded by the invention is so high as to permit supplying a gas turbine with purified gas from a firing system so that a combination of gas turbines and Velox boilers becomes economically applicable. The dust separation at high temperature according to the invention is also applicable directly inside the firing systems or flue gas systems of boiler plants.

The invention is further applicable for dust removal in small chimneys. For example, bath houses, hospitals, crematories, small plants and, if desired, even house chimneys can be kept dust-free with relatively simple means. In firing systems for the production of steam, for example on locomotives, the lateral injection for exciting the primary flow can be effected with steam, if desired. In other cases, the lateral injection of a second quantity of gas may also be effected by branching a portion of the smoke gases or other fluid from the main fluid flow.

A dust separation according to the invention is further favorable in many cases where purification of air is the main objective. This applies, for example, to the removal of cement dust, clay or fire-brick dust, glass wool, and to the purification of air from dust in grinding plants and stone fabricating plants. By exhausting and purifying the air in accordance with the invention and thereafter returning the purified air into the plant building, large quantities of heat can be saved which otherwise would require a corresponding power consumption for space heating purposes. Thus, the invention affords using for space heating a number of inherently innocuous waste gases which heretofore had to be exhausted into the free atmosphere, so that their heat content was wasted.

In a similar manner, gaseous or liquid particles can be driven out of solid particles. Due to the periodic pressure and temperature variations caused by the sinusoidal relative forces, the diffusion of the liquid or gaseous particles out of the interior of the solid particles is greatly promoted; and for the same reason the evaporation or dissolution of liquid particles is likewise promoted. This method is well applicable, for example, for the drying of coal dust prior to combustion.

The application of the invention to chemical reactors affords shortening the reaction period by virtue of the fact that the particles within the flow are subjected to intimate mixing and frequent collisions of the reaction components will occur. This is of advantage for those methods in which heretofore undesirably prolonged reaction periods were required, for example in the processing of raw water and waste water.

Such a chemical reactor can readily be combined with, or designed for, the separation of the reaction products on the principles of the invention explained in the foregoing.

It will be obvious to those skilled in the art, upon a study of this disclosure, that our invention is amenable to a great variety of modifications and uses and hence may be embodied in devices and employed for purposes other than particularly set forth herein, without departing from the essential features of our invention and within the scope of the claims annexed hereto.

We claim:

1. Apparatus for processing fluid media containing entrained solid matter for the purpose of separating the solid matter from the medium, comprising a container structure having side walls and forming a processing space and having an inlet duct for fluid medium near its bottom and an outlet duct for said medium above said inlet duct, said two ducts being parallel and defining together an upwardly directed primary-flow axis in said processing space, said container structure having lateral duct means for supplying another quantity of fluid medium, means forming a rough ground at the upper end of said inlet duct, said lateral duct means being directed generally tangential to said side walls and terminating at the inner surface thereof and being directed downwardly inclined relative to the primary-flow axis so as to superimpose upon said primary flow a circulatory flow having in said space a vortex sink near said inlet duct and a vortex source remote from said inlet duct, whereby the resulting flow causes relative forces to impose particle separating action upon the flowing medium, said container having discharge duct means for removal of the separation product, and gas inlet means connected to said discharge duct means to produce an exhaust action.

2. Apparatus according to claim 1, said inlet duct having a top opening within said container, said means forming a rough ground comprising a mesh structure covering said top opening.

3. Apparatus according to claim 1, said inlet duct protruding upwardly into said container and comprising an upwardly widening top portion having a top opening located in upwardly spaced relationship to said discharge duct means.

4. Apparatus according to claim 1, comprising means mounting a deflector body stationarily in said processing space intermediate said inlet and outlet ducts.

5. Apparatus according to claim 1, comprising a body of rotationally symmetrical shape mounted in said processing space coaxially between said outlet duct and said inlet duct.

6. Apparatus according to claim 1, said lateral duct means comprising a plurality of spaced tangential ducts.

7. Apparatus for separating particulate matter from fluid media, comprising a processing container having side walls and forming a processing space and having an inlet duct near its bottom and an outlet duct above and parallel to said inlet duct for passing a flow of medium through said space, said inlet and outlet ducts defining together a primary flow axis, agitating means for imparting to the primary flow of the medium in said space a circulatory secondary flow, said agitating means comprising a plurality of fluid-injection nozzle means circumferentially spaced from each other about said axis, said nozzle means also being spaced from each other axially along said processing container, each of said nozzle means being directed substantially tangential to and terminating at the inside of said walls and inclined relative to said axis toward said inlet duct so that said agitating means superimposes on said primary flow a secondary flow having a potential flow component and a rotary-flow component to form in said space a vortex sink near said inlet duct and a vortex source remote from said inlet duct, said container having a receiving portion at its bottom for collecting substance separated out from the combined primary and secondary flow of said medium.

8. Apparatus according to claim 7, said inlet duct protruding upwardly into said container and having its upper end forming a top opening located in upwardly spaced relation to said receiving portion.

9. Apparatus according to claim 8, said inlet duct protruding upwardly into said container and having an upwardly widening portion.

10. Apparatus according to claim 7, said inlet duct protruding upwardly into said container and having its upper end forming a top opening located in upwardly spaced relation to said receiving portion, said inlet duct being located in spaced relation to the container walls so as to define an annular collecting space forming part of said receiving portion, and discharge duct means communicating with said collecting space.

References Cited by the Examiner

UNITED STATES PATENTS

| | | |
|---|---|---|
| 1,070,800 | 8/13 | Gross. |
| 1,620,266 | 3/27 | McCarthy. |
| 2,153,026 | 4/39 | Ringius _____ 55—459 |
| 2,252,581 | 8/41 | Saint-Jacques _____ 55—459 |
| 2,650,675 | 9/53 | Yellott. |
| 2,763,337 | 9/56 | Schneible. |
| 2,795,293 | 6/57 | Allen. |
| 2,869,677 | 1/59 | Yellott et al. |
| 2,873,815 | 2/59 | Swayze. |
| 2,874,118 | 2/59 | Albertsen _____ 210—512 |

FOREIGN PATENTS

| | | |
|---|---|---|
| 525,985 | 2/54 | Belgium. |
| 374,890 | 4/07 | France. |
| 447,802 | 11/12 | France. |
| 473,878 | 3/29 | Germany. |
| 480,213 | 7/29 | Germany. |
| 712,792 | 7/54 | Great Britain. |
| 752,353 | 7/56 | Great Britain. |
| 542,605 | 4/56 | Italy. |
| 333,400 | 11/58 | Switzerland. |

HARRY B. THORNTON, *Primary Examiner.*

HERBERT L. MARTIN, WALTER BERLOWITZ, HERMAN BERMAN, *Examiners.*